(12) United States Patent
Weber et al.

(10) Patent No.: US 8,859,971 B2
(45) Date of Patent: Oct. 14, 2014

(54) LIGHT REDIRECTION IN OPTICAL NAVIGATION

(75) Inventors: Arnett Ryan Weber, Waterloo (CA); James Alexander Robinson, Elmira (CA); Robert James Lowles, Waterloo (CA); Derek Raymond Solven, San Jose, CA (US); Kuo-Feng Tong, Waterloo (CA); Yun Seok Choi, Waterloo (CA)

(73) Assignee: BlackBerry Limited, Waterloo Ontario (CA)

( * ) Notice: Subject to any disclaimer, the term of this patent is extended or adjusted under 35 U.S.C. 154(b) by 337 days.

(21) Appl. No.: 13/273,693

(22) Filed: Oct. 14, 2011

(65) Prior Publication Data

US 2013/0092838 A1   Apr. 18, 2013

(51) Int. Cl.
| | |
|---|---|
| *G01J 5/02* | (2006.01) |
| *G06F 3/033* | (2013.01) |
| *G06F 3/042* | (2006.01) |
| *G01J 1/04* | (2006.01) |
| *G01J 1/06* | (2006.01) |
| *G06F 3/0354* | (2013.01) |
| *G01J 1/02* | (2006.01) |

(52) U.S. Cl.
CPC ............. *G01J 1/0407* (2013.01); *G01J 1/06* (2013.01); *G01J 2001/061* (2013.01); *G06F 3/0421* (2013.01); *G06F 3/03547* (2013.01); *G01J 1/0214* (2013.01)
USPC ........... 250/353; 345/175; 345/158; 345/166; 345/161

(58) Field of Classification Search
USPC .......... 250/353; 345/157, 161, 173, 175, 158, 345/166
See application file for complete search history.

(56) References Cited

U.S. PATENT DOCUMENTS 6,320,177 B1 * 11/2001 Sayag ........................ 250/208.1
6,967,321 B2   11/2005 Leong et al.
(Continued)

FOREIGN PATENT DOCUMENTS

| WO | 2004059613 | 7/2004 |
|---|---|---|
| WO | WO 2004059613 | 7/2004 |

OTHER PUBLICATIONS

EESR dated Mar. 26, 2012 for European Patent Application No. 11185323.0.

(Continued)

*Primary Examiner* — David Porta
*Assistant Examiner* — Mindy Vu
(74) *Attorney, Agent, or Firm* — Jon A. Gibbons; Fleit Gibbons Gutman Bongini & Bianco PL

(57) ABSTRACT

An optical navigation device, such as an optical navigation joystick or mouse, includes an internal redirector which may be separate or formed from material of a touch surface of the optical device. The redirector is disposed at an angle with respect to a plane of the touch surface, operative to reflect light which would otherwise strike the touch surface at a low angle and be internally reflected. The light may be reflected in a direction away from a light sensor of the device, reducing sensed internally reflected light, or may be reflected into the touch surface at a higher angle, potentially increasing a quantity of good signal. The redirector may also include portions which block light directly emitted from a light emitter, or reflected off other surfaces of the navigation device.

18 Claims, 5 Drawing Sheets

(56) References Cited

U.S. PATENT DOCUMENTS

| | | |
|---|---|---|
| 6,974,947 B2 * | 12/2005 | Black et al. ............... 250/221 |
| 7,321,359 B2 | 1/2008 | Xie et al. |
| 7,399,955 B2 | 7/2008 | Lee et al. |
| 7,492,461 B2 | 2/2009 | Hebert et al. |
| 7,568,819 B2 | 8/2009 | Lee et al. |
| 7,710,570 B2 | 5/2010 | Leong et al. |
| 7,719,517 B2 | 5/2010 | Larsen et al. |
| 7,719,524 B2 * | 5/2010 | Hoshino et al. ............ 345/175 |
| 7,825,895 B2 * | 11/2010 | Bynum et al. ............. 345/156 |
| 2002/0080117 A1 | 6/2002 | Son et al. |
| 2003/0021284 A1 | 1/2003 | Iwasaki et al. |
| 2004/0084610 A1 | 5/2004 | Leong et al. |
| 2005/0253058 A1 | 11/2005 | Leong et al. |
| 2006/0028442 A1 | 2/2006 | Bynum et al. |
| 2006/0131487 A1 | 6/2006 | Mathis et al. |
| 2007/0200826 A1 | 8/2007 | Zeng et al. |
| 2008/0001922 A1 | 1/2008 | Johnson et al. |
| 2009/0279270 A1 | 11/2009 | Lee et al. |
| 2010/0079408 A1 | 4/2010 | Leong et al. |
| 2010/0207911 A1 * | 8/2010 | Newton ..................... 345/175 |
| 2010/0220900 A1 | 9/2010 | Orsley |
| 2011/0122061 A1 * | 5/2011 | Stenmark et al. ........... 345/157 |

OTHER PUBLICATIONS

Canadian Examination Report dated Dec. 30, 2013 for Canadian Application No. 2792281.

* cited by examiner

LIGHT REDIRECTION IN OPTICAL NAVIGATION

FIELD OF THE DISCLOSURE

The present disclosure generally relates to an optical joystick or mouse, and more particularly to light redirecting inside an optical joystick.

BACKGROUND

Many computing devices include an optical navigation device, such as a trackpad, joystick or mouse, which senses movement and gestures of a user. In these devices, light is directed to a light transmitting surface upon which an object, such as one or more fingers, is moved. The finger reflects light to a sensor beneath the surface, which transmits information corresponding to light reflected from the moving finger to a processor. The processor interprets the movement of patterns of transmitted data, in order to determine the corresponding movement of the finger. In this manner, gestures may be communicated from the user to a processor of the computing device.

Accurately sensing reflected light within an optical joystick is a challenge. This challenge is especially true with smaller optical joystick packages placed in handheld electronic apparatus. Oftentimes, the signal quality produced by detection of the reflected light patterns is poor. This poor signal quality results in a poor navigation response to user inputs.

BRIEF DESCRIPTION OF THE DRAWINGS

The accompanying figures, where like reference numerals refer to identical or functionally similar elements throughout the separate views, and which together with the detailed description below are incorporated in and form part of the specification, serve to further illustrate various examples and to explain various principles and advantages all in accordance with the present disclosure, in which.

DETAILED DESCRIPTION

As required, detailed embodiments are disclosed herein; however, it is to be understood that the disclosed embodiments are merely examples and that the systems and methods described below can be embodied in various forms. Therefore, specific structural and functional details disclosed herein are not to be interpreted as limiting, but merely as a basis for the claims and as a representative basis for teaching one skilled in the art to variously employ the present subject matter in virtually any appropriately detailed structure and function. Further, the terms and phrases used herein are not intended to be limiting, but rather, to provide an understandable description of the concepts.

The terms "a" or "an", as used herein, are defined as one or more than one. The term plurality, as used herein, is defined as two or more than two. The term another, as used herein, is defined as at least a second or more. The terms "including" and "having," as used herein, are defined as comprising (i.e., open language). The term "coupled," as used herein, is defined as "connected," although not necessarily directly, and not necessarily mechanically.

Figure 1:
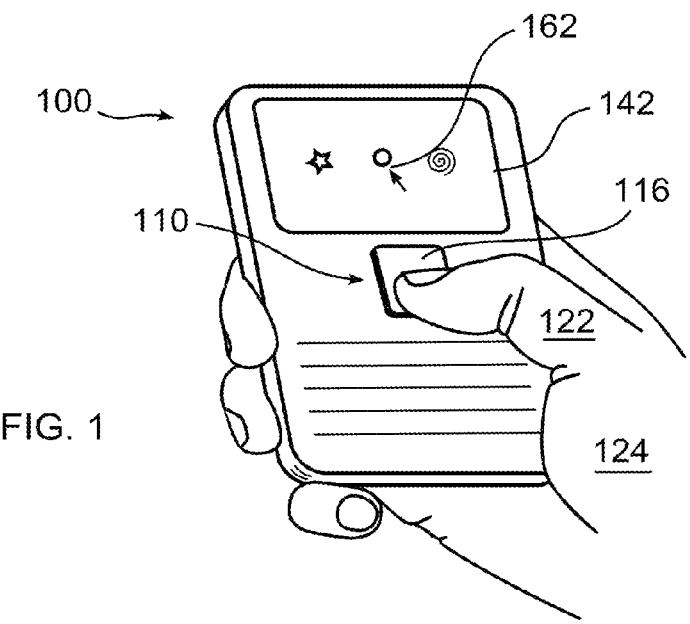
FIG. 1 depicts an example handheld electronic apparatus incorporating an optical navigation device.

FIG. 1 depicts an example handheld electronic apparatus 100 incorporating an optical navigation device 110 with a touch surface 116 operable by fingers, such a user's thumb 122 on user's hand 124. Although a thumb of a user is shown, any object may be moved across the touch surface 116 for navigation, including a stylus or pen. The handheld electronic apparatus 100 includes a display 142 and with a cursor 162 movable by the navigation device 110. Further details of the handheld electronic apparatus 100 are described below.

Figure 2:
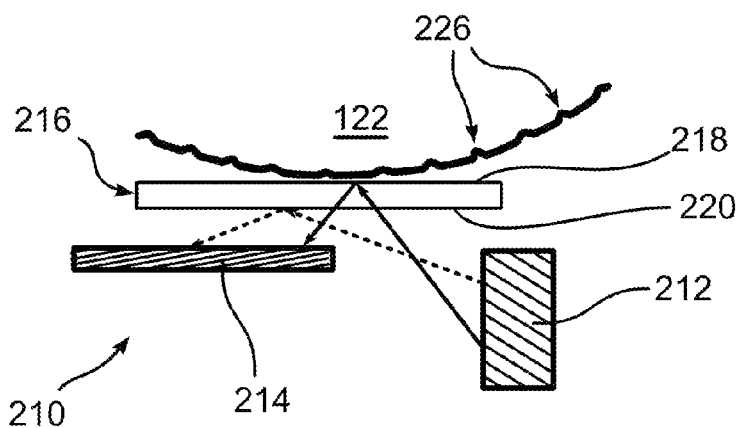
FIG. 2 depicts an enlarged detail of a finger and a cross-sectional view of the optical navigation device of FIG. 1.

FIG. 2 is a cross-section view of an example optical navigation device 210 with a finger 122 of a user 124 positioned upon a touch surface 216. The optical navigation device 210 includes a light emitter 212 and a light sensor 214. A touch surface 216 is positioned proximate to emitter 212 and sensor 214, and defines a thickness between an upper surface 218 and a lower surface 220. In a typical use of optical navigation device 210, a fingertip or other object 122 controlled by a user moves across touch surface 216 and causes a reflection of light emitted by emitter 212 to be sensed by sensor 214. More particularly, sensor 214 communicates digital information corresponding to the movement of this pattern of light. Finger 122 is illustrated as a fingertip, with distinct fingerprint ridges 226. When finger 122 is a fingertip, the fingerprint ridges 226 may provide sufficient irregularity to form a good signal. In contrast, a regular pattern often times produces unwanted noise. Therefore regular patterns are more difficult to distinguish over noise than irregular patterns. A controller or microprocessor (not shown) analyzes a signal provided by sensor 214 and determines a location of finger 122 upon touch surface 216 as a function of time. This analysis is interpreted by processor to interpret navigational gestures of a user's hand 124. Touch surface 216 is formed of a material which is at least partially transparent to light waves emitted by emitter 212, whereby light emitted may reflect from finger 122 positioned upon touch surface 216 to be received at sensor 214 positioned below surface 216.

In FIG. 2, specular reflection from finger 122 is illustrated. Specular reflection is the reflection of light from a surface, in which light from a single incoming direction (i.e. a "ray") is reflected into a single outgoing direction. The direction of incoming light (the incident ray), and the direction of outgoing light reflected (the reflected ray) make the same angle with respect to the surface normal. Thus, the angle of incidence (angle of incoming light with respect to a line perpendicular to the surface) equals the angle of reflection (angle of reflected light with respect to the line perpendicular to the surface). Although diffuse reflection, in which light is reflected in many directions, exists at all boundary interfaces, for example at top surfaces 218 and bottom surface 220, to clarify operation, only specular reflection is illustrated. However, it should be noted that the noise of the diffuse reflections may be significant in terms of the design and operation of an optical sensor. As further described below, the incidence of both diffuse and unwanted specular reflections is advantageously reduced in accordance with the present disclosure, in order to increase a quantity of good signal representing an actual positioning of finger 122 upon surface 216, and to reduce a quantity of noise which misrepresents a position of finger 122.

Typically, specular reflection takes place to a greater extent when the angle of incidence is closer to an angle that is normal (i.e. perpendicular) to the surface. In other words, at a "high" angle with respect to a plane of the surface (a "high" angle). Specular reflection takes place to a lesser extent as the angle of incidence increases from the normal angle relative to a plane of the surface (a "low" angle with respect to a plane of the surface (a "low" angle), until a critical angle is reached at which substantially all light is reflected internally (internally reflected light). In the illustrations, the dashed arrows indicate a low angle, if not a critical angle, and therefore illustrate some or all of the light reflecting internally from lower surface 220. Conversely, the solid arrows indicate light reflecting from a high angle, and therefore light is shown to pass through surface 220 to reach surface 218. At surface 218, if an angle of light is still sufficiently high, light will pass through surface 218 to reflect from finger 122. Herein, a plane of the surface is substantially coplanar with a plane upon which a finger may move in contact with the surface.

For simplicity of illustration and understanding, a single solid arrow is illustrated for light reflected from finger 122, and a single dashed arrow is illustrated for light which would tend to be internally reflected; however, as understood by those skilled within the art, light, for example from an emitter of infrared or visible light, would be projected at many different angles.

Light which is not reflected from finger 122, but reaches sensor 214, may be considered to have leaked and is generally a potential source of undesired signal. It should be understood that light may be internally reflected from touch surface 216, or any other portion of an optical device 210, including a housing for touch surface 216, or any other components of the device 210. This undesired signal may have the effect, for example, of sluggish or non-responsive navigation, when the optical device 210 is used for navigation.

Figure 3:
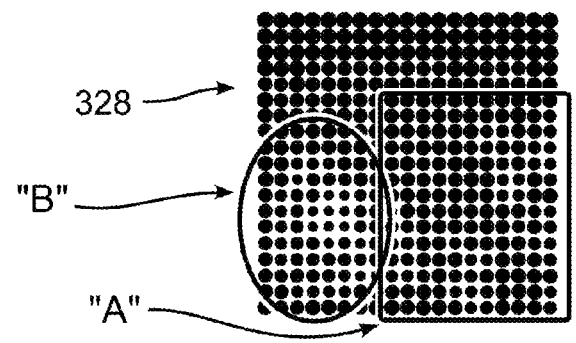
FIG. 3 illustrates a pattern of light reflected by finger 122 on touch surface 216 of FIG. 2.

FIG. 3 illustrates a pattern of light reflected by finger 122 on touch surface 216. More specifically, the reflections from finger 122, as sensed by sensor 214, are illustrated diagrammatically within rectangular region "A", in data representation 328. In particular light and dark regions in FIG. 2 indicate locations of relatively greater or lesser amounts of light reflected from finger 122, representative of a data signal generated by sensor 214. Region "A" indicates data which is typical of a good signal, indicating a correct position of finger 122.

With reference again to FIG. 2, it may be seen that the dashed arrow has internally reflected from lower surface 220. This incidence on sensor 214 is indicated in FIG. B by an oval "B" surrounding a "bright" spot within data representation 328. The data represented within oval "B" may be considered noise, as this data is not indicative of a position of finger 122 upon surface 216. Controller or microprocessor may misinterpret the data within region "B" to be representative of movement upon surface 216. Alternatively, the bright spot may mask or obscure valid data which would otherwise have been indicated within region "B", and an improper determination of a location of finger 122 may thus result.

Finger 122 has a surface forming angles within ridges 226 that may cause light to be reflected back through lower surface 220 and received by sensor 214, in the form of a specific pattern of light. A displacement of one or more portions of this pattern, over time, can be used to determine a direction and speed of finger 122, and optical sensor 210 can thereby be used to interpret a gesture of user 124.

Figure 4:
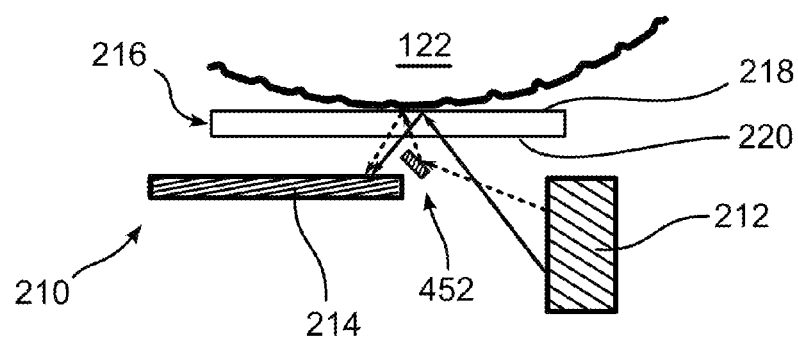
FIG. 4 depicts a cross-section view of an example optical navigation device including a redirector for reducing internally reflected light.

In FIG. 4, is a cross-sectional view of an example optical navigation device 210 with a redirector 452, oriented to intercept light emitted from emitter 212 at low angle and redirect the angle of the light. Redirector 452 reflects such light, from a reflective surface or face, into touch surface 216 at a sufficiently high angle to enable light to pass through touch surface 216 and be reflected by finger 122 back to sensor 214. In this manner, signal generated by sensor 214 based on light indicated by both the dashed and solid arrows is indicative of a position of finger 122, and may be construed by a controller as good data. Redirector 452 is sized to intercept a desired quantity of light which would otherwise be internally reflected from touch surface 216. In one example, redirector 452 is angled with respect to touch surface 216 in order to transmit the intercepted light into touch surface 216 at an angle greater than the critical angle, and at an angle sufficiently high to cause the transmitted light to reflect by finger 122 to sensor 214, whereby the transmitted light is indicative of a position of finger 122 upon touch surface 216.

Figure 5:
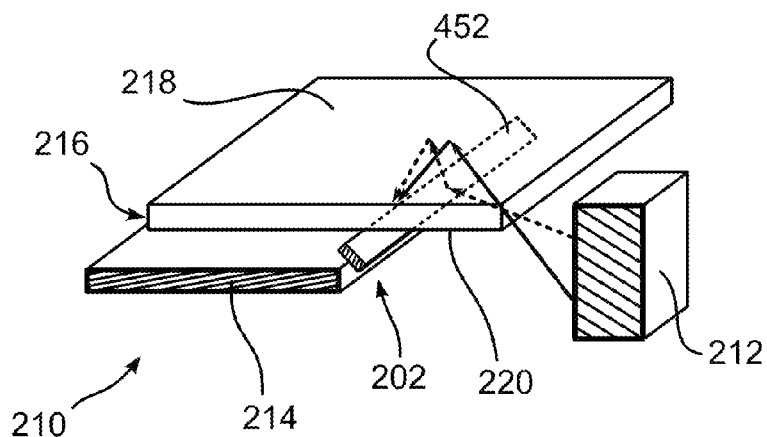
FIG. 5 illustrates a perspective view of the optical navigation device incorporating a redirector of FIG. 4.

FIG. 5 illustrates a perspective view of the optical navigation device of FIG. 4. It should be understood that the size and geometric shape of the components shown and described herein may vary substantially from what is illustrated, without departing from the spirit and scope of this example.

Figure 6:
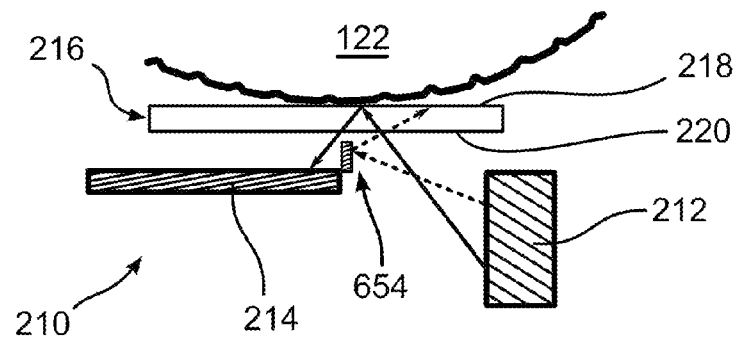
FIG. 6 is a cross-sectional view of an alternative type and location for a redirector in an example optical navigation device.

With reference to FIG. 6, a cross-sectional view of an example optical navigation device 120 with a redirector 654 is provided. Redirector 654 is positioned at an angle operative to prevent transmission of light which would otherwise strike touch surface 216 at a low angle, i.e. an angle less than 45 degrees, with respect to the bottom surface 220 of the touch surface 216. Redirector 654 may redirect the angle of the light or reflect such light at an angle in a direction away from sensor 214, as illustrated, or may reflect such light into a finger 122 which would not otherwise reflect into sensor 214, or redirector 654 may not reflect light at all. In this manner, light which would strike touch surface 216 at a low angle is prevented from doing so, result in reduced or avoided noise.

In FIG. 6, redirector 654 is oriented vertically with respect to a surface of sensor 214 (i.e. substantially perpendicular to), or touch surface 216, and lies within a region through which light passes at a low angle when reflected from touch surface 216 in order to be sensed by sensor 214. Light which reflects at a low angle, but which would not be sensed by sensor 214, does not need to be blocked, and therefore, in one example, redirector 654 is sized and positioned to at least, or only, block internally reflected light which might otherwise be misinterpreted as a potentially good signal.

Figure 7:
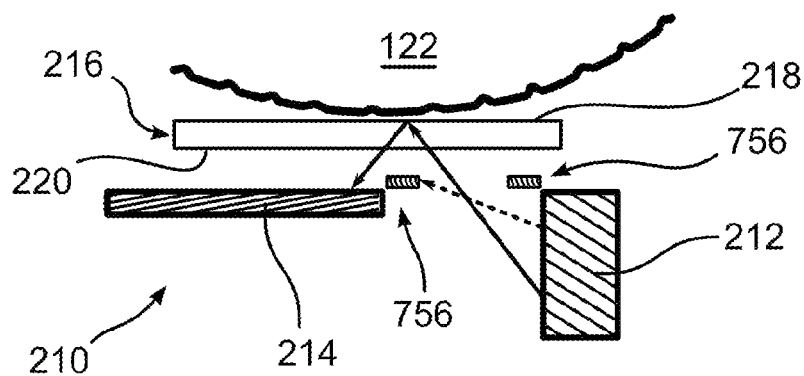
FIG. 7 is a cross-sectional view of a further alternative type and location for a redirector in an example optical navigation device.

In FIG. 7, is a cross-sectional view of an example optical navigation device 210 where a plurality of reflecting or blocking barriers form redirector 756, whereby light transmitted in divergent or opposite directions is blocked, reflected or redirected. In this manner, noise due to light reflected from other surfaces than touch surface 216 may be reduced or eliminated.

Figure 8:
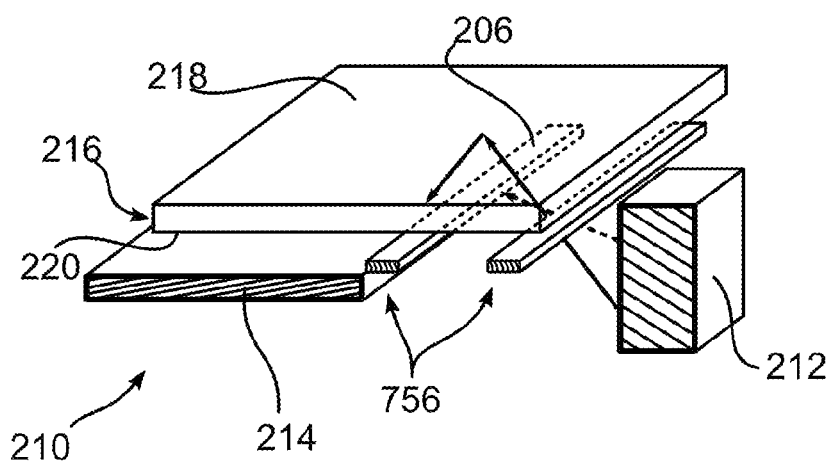
FIG. 8 illustrates a perspective view of the optical navigation incorporating a redirector of FIG. 7.

In the perspective view of FIG. 8 of the optical navigation device in FIG. 7, it may be seen that a portion of redirector 756 is positioned adjacent emitter 212, whereby light will be blocked or reflected. This configuration avoids multiple reflections which may result in light striking sensor 214 that is not attributable to a position of finger 122 upon touch surface 216.

Figure 9:
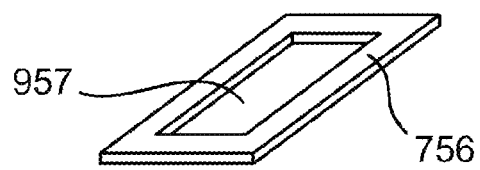
FIG. 9 illustrates a perspective view of the redirector of FIGS. 7 and 8.

FIG. 9 is a perspective view of the redirector of FIGS. 7 and 8. Redirector 756, shown in FIGS. 7 and 8, may be a variety of sizes and geometric shapes and include a plurality of sides to block the transmission of light which might otherwise strike touch surface 216 at a low angle and be internally reflected, thereby resulting incorrectly as good data. While the redirector 756 is illustrated in FIG. 9 as defining a large rectangular aperture 957, it should be understood that aperture 957 may have any form, including rounded, oval, polygonal, or irregular, or may be formed to be a narrow slit. Aperture 957 is sized, dimensioned, and located so that a shadow or gap is not formed in the output of sensor 214, in a disadvantageous location.

A redirector may be easily replaced to provide for improvements in functionality and signal quality, to enable substitution of emitter 212 with a different type, or to correct for changes in ambient conditions or locale. Redirector 756 may be formed from any inorganic material or organic material or both of a light transmissive or reflective material, in which a non-light transmissive material is placed over at least a portion of the redirector preventing light from passing through that portion, while allowing light to pass only through a non-covered portion, for example through aperture 957.

Figure 10:
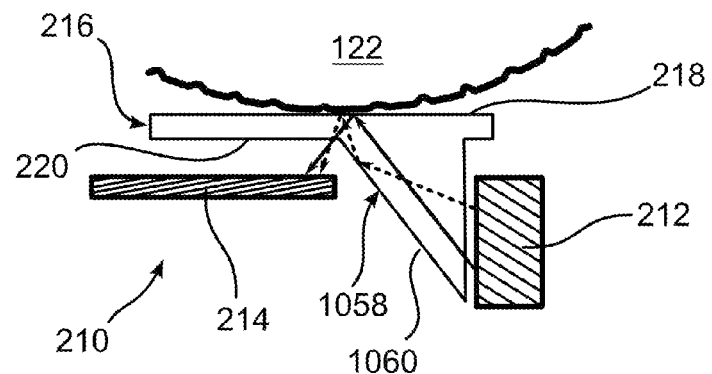
FIG. 10 is a cross-sectional view of a redirector formed as an extension of a touch surface in an example optical navigation device.

Referring now to FIG. 10, a cross-sectional view of an example optical navigation device with a touch surface 216 formed with an extending redirector 1058 is shown. In this example, the extending redirector 1058 is formed to reflect light from angular surface 1060 which is emitted from emitter 212 at an angle which would otherwise be internally reflected from touch surface 216 at a low angle, and be thereby sensed by sensor 214. Extending redirector 1058 may be continuously formed from material of touch surface 216, and may be solid, or at least partially hollow. Extending redirector 1058 may alternatively be formed separately, and attached to touch surface 216 by any means, including adhesive, pins, mating attachment, or threadable attachment. Extending redirector 1058 is positioned to extend from lower portion 220 of touch surface 216, beginning at a point at which light emitted from emitter 212 would not strike touch surface 216 at a low angle. It should be understood that light may be internally reflected from lower surface 220, an interior portion of touch surface 216, or a lower side of upper surface 218. An angular surface 1060 of extending redirector 1058 is determined to reflect light at a high angle into touch surface 216, to boost a good signal, or at an angle which reflects light away from a direction where internally reflected light might be sensed by sensor 214. In one example, extending redirector 1058 forms a light guide or prism to guide or redirect light with low signal loss, in order to boost a good signal, as described herein.

In one example, redirector 1058 forms a light guide or prism, wherein light may be reflected internally with respect to an interior of redirector 1058, the reflected light ultimately transmitted from redirector 1058 at a high angle, where it may be reflected from finger 122.

Figure 11:
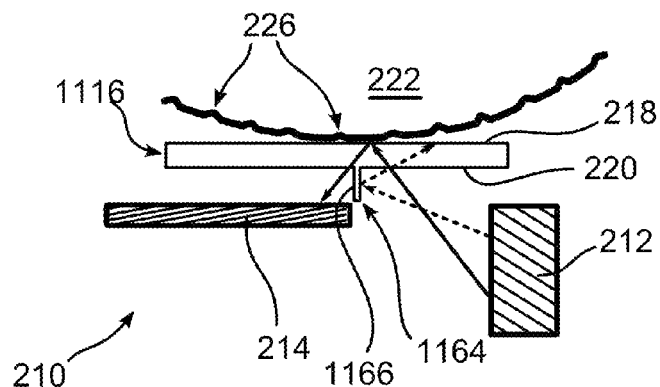
FIG. 11 is a cross-sectional view of a light blocking redirector in an example optical navigation device.

FIG. 11 illustrates an optical navigation device 210 with extending redirector 1164. In this example, the redirector 1164 is positioned at a specific location to block an area through which light emitted from emitter 212 normally passes through at a low angle in order to strike touch surface 1116, thereby resulting in a sensing of light by sensor 214 which is not representative of a position of finger 122. In this manner, extending redirector 1164 operates as a light dam or shield. Extending redirector 1164 may be continuously formed from any organic material or inorganic material or both of touch surface 1116, and may be solid, or at least partially hollow. A material which is not light transmissive, such as paint, tape, or adhesive backed material, for example PORON® (a urethane foam which is a registered trademark of World Properties, Inc., of Lincolnwood, Ill.), or other non-transmissive material may be used. Alternatively, extending redirector 1164 may be formed separately, and attached to touch surface 1116 by any known means, including adhesive, pins, mating attachment, or threadable attachment. Extending redirector 1164 may reflect light, as illustrated, or may only block transmission of light.

Figure 12:
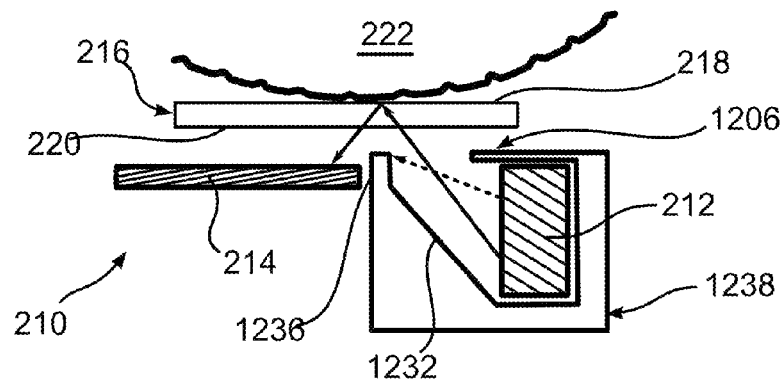
FIG. 12 is a cross-sectional view of a combination of redirecting and blocking elements in an example optical navigation device.

FIG. 12 illustrates an example optical navigation device 210 with a redirector 1238 which forms at least part of a housing surrounding emitter 212. Alternatively, redirector 1238 may be integrally formed as part of emitter 212, or may be attached to emitter 212. Redirector 1238 combines elements of redirectors 1058 and 1164, including angular surface 1060 corresponding to redirector portion 1232 and blocking surfaces corresponding to 1206 and 1236, respectively. In addition, redirector portion 1232 may surround emitter 212 to further reduce potential noise from light reflecting from multiple surfaces.

Any of the example redirectors described may be formed with reflective material, for example a metallic material, such as silver, gold, chrome, or aluminum; or dielectric coatings, such as silicon oxides or silicon nitrides. Where it is desired to avoid transmission or reflection of light, any redirector may be formed with any material sufficiently non-reflective and opaque. In each case, redirector is operative to reduce or prevent the transmission of light at a low angle which is internally reflected to be sensed by sensor 214. Where redirector is reflective, it may operate as described above to boost or increase a quantity of good signal by directing additional light through touch surface 216 at a high angle. Moreover, the redirectors may have a uniform or non-uniform gradient filter to block certain wavelengths of light at specific regions.

In another example, more than one type of redirector may be combined. In another example, any of the redirectors above may be disposed at an angle with respect to a plane of touch surface 216 whereby light emitted from emitter 212 which would otherwise strike surface 216 at a first angle relative to a line normal to the touch surface 216 (i.e. angle of incidence) operative to create internally reflected light, is reflected into touch surface 216 at a second angle of incidence smaller than the first angle, thereby reducing internally reflected light.

In still another example, any of the redirectors above do not reflect a sufficient amount of light to cause light which would otherwise strike surface 216 at a low angle to be reflected into sensor 214. For example, redirector is non-reflective, and blocks or absorbs such light. In this example, the redirectors may alternatively include both reflecting portions and non-reflecting portions. An extent of reflective or non-reflective surfaces, and an angle of redirector 452, 1058, is determined based on a particular configuration of optical navigation device 210, such surfaces and angle selected to "tune" or adjust for eliminating light from striking sensor 214 which is not attributed to movement of finger 122 upon surface 216. Further, more than one redirector 452, 1058 may be provided for packaging or otherwise eliminating undesired reflected light.

Further, any of the redirectors above may also include portions which are transparent, or partially transparent, in addition to portions which reflect or block light, whereby such portions, positioned in a location for which light need not be blocked or reflected, may allow light to pass which may be reflected from finger 122. A redirector may include or be combined with any or all of the features illustrated and discussed for any other redirector disclosed herein.

Figure 13:
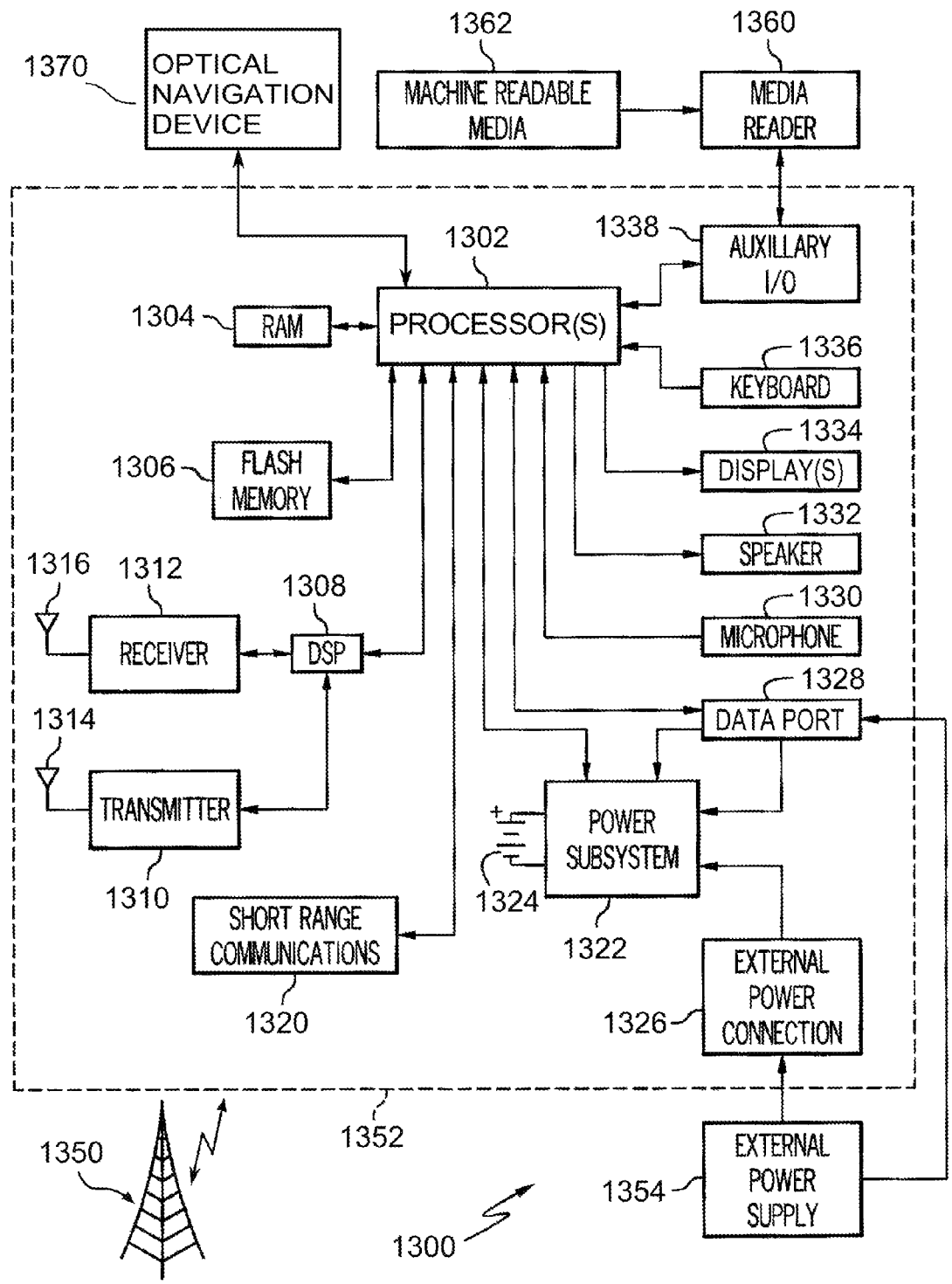
FIG. 13 is a block diagram illustrating a detailed view of an example handheld electronic apparatus with an optical navigation device.

One or more of optical navigation devices 1370 as described in the examples above may be integrated with any of the components shown in FIG. 13, which is a block diagram of an electronic device and associated components 1300. In this example, an electronic device 1352 is a wireless two-way communication device with voice and data communication capabilities. Such electronic devices communicate with a wireless voice or data network 1350 using a suitable wireless communications protocol. Wireless voice communications are performed using either an analog or digital wireless communication channel. Data communications allow the electronic device 1352 to communicate with other computer systems via the Internet. Examples of electronic devices that are able to incorporate the above described systems and methods include, for example, a data messaging device, a two-way pager, a cellular telephone with data messaging capabilities, a wireless Internet appliance or a data communication device that may or may not include telephony capabilities.

The illustrated electronic device 1352 is an example electronic device that includes two-way wireless communications functions. Such electronic devices incorporate communication subsystem elements such as a wireless transmitter 1310, a wireless receiver 1312, and associated components such as one or more antenna elements 1314 and 1316. A digital signal processor (DSP) 1308 performs processing to extract data from received wireless signals and to generate signals to be transmitted. The particular design of the communication subsystem is dependent upon the communication network and associated wireless communications protocols with which the device is intended to operate.

The electronic device 1352 includes a microprocessor 1302 that controls the overall operation of the electronic device 1352. The microprocessor 1302 interacts with the above described communications subsystem elements and also interacts with other device subsystems such as flash memory 1306, random access memory (RAM) 1304, auxiliary input/output (I/O) device 1338, data port 1328, display 1334, keyboard 1336, speaker 1332, microphone 1330, a short-range communications subsystem 1320, a power subsystem 1322, and any other device subsystems.

A battery 1324 is connected to a power subsystem 1322 to provide power to the circuits of the electronic device 1352. The power subsystem 1322 includes power distribution circuitry for providing power to the electronic device 1352 and also contains battery charging circuitry to manage recharging the battery 1324. The power subsystem 1322 includes a battery monitoring circuit that is operable to provide a status of one or more battery status indicators, such as remaining capacity, temperature, voltage, electrical current consumption, and the like, to various components of the electronic device 1352.

The data port 1328 is able to support data communications between the electronic device 1352 and other devices through various modes of data communications, such as high speed data transfers over an optical communications circuits or over electrical data communications circuits such as a Universal Serial Bus (USB) connection incorporated into the data port 1328 of some examples. Data port 1328 is able to support communications with, for example, an external computer or other device.

Data communication through data port 1328 enables a user to set preferences through the external device or through a software application and extends the capabilities of the device by enabling information or software exchange through direct connections between the electronic device 1352 and external data sources rather then via a wireless data communication network. In addition to data communication, the data port 1328 provides power to the power subsystem 1322 to charge the battery 1324 or to supply power to the electronic circuits, such as microprocessor 1302, of the electronic device 1352.

Operating system software used by the microprocessor 1302 is stored in flash memory 1306. Further examples are able to use a battery backed-up RAM or other non-volatile storage data elements to store operating systems, other executable programs, or both. The operating system software, device application software, or parts thereof, are able to be temporarily loaded into volatile data storage such as RAM 1304. Data received via wireless communication signals or through wired communications are also able to be stored to RAM 1304.

The microprocessor 1302, in addition to its operating system functions, is able to execute software applications on the electronic device 1352. A predetermined set of applications that control basic device operations, including at least data and voice communication applications, is able to be installed on the electronic device 1352 during manufacture. Examples of applications that are able to be loaded onto the device may be a personal information manager (PIM) application having the ability to organize and manage data items relating to the device user, such as, but not limited to, e-mail, calendar events, voice mails, appointments, and task items.

Further applications may also be loaded onto the electronic device 1352 through, for example, the wireless network 1350, an auxiliary I/O device 1338, data port 1328, short-range communications subsystem 1320, or any combination of these interfaces. Such applications are then able to be installed by a user in the RAM 1304 or a non-volatile store for execution by the microprocessor 1302.

In a data communication mode, a received signal such as a text message or web page download is processed by the communication subsystem, including wireless receiver 1312 and wireless transmitter 1310, and communicated data is provided the microprocessor 1302, which is able to further process the received data for output to the display 1334, or alternatively, to an auxiliary I/O device 1338 or the data port 1328. A user of the electronic device 1352 may also compose data items, such as e-mail messages, using the keyboard 1336, which is able to include a complete alphanumeric keyboard or a telephone-type keypad, in conjunction with the display 1334 and possibly an auxiliary I/O device 1338. Such composed items are then able to be transmitted over a communication network through the communication subsystem.

For voice communications, overall operation of the electronic device 1352 is substantially similar, except that received signals are generally provided to a speaker 1332 and signals for transmission are generally produced by a microphone 1330. Alternative voice or audio I/O subsystems, such as a voice message recording subsystem, may also be implemented on the electronic device 1352. Although voice or audio signal output is generally accomplished primarily through the speaker 1332, the display 1334 may also be used to provide an indication of the identity of a calling party, the duration of a voice call, or other voice call related information, for example.

Depending on conditions or statuses of the electronic device 1352, one or more particular functions associated with a subsystem circuit may be disabled, or an entire subsystem circuit may be disabled. For example, if the battery temperature is low, then voice functions may be disabled, but data communications, such as e-mail, may still be enabled over the communication subsystem.

A short-range communications subsystem 1320 provides for data communication between the electronic device 1352 and different systems or devices, which need not necessarily be similar devices. For example, the short-range communications subsystem 1320 includes an infrared device and associated circuits and components or a Radio Frequency based communication module such as one supporting Bluetooth® communications, to provide for communication with similarly-enabled systems and devices, including the data file transfer communications described above.

A media reader 1360 is able to be connected to an auxiliary I/O device 1338 to allow, for example, loading computer readable program code of a computer program product into the electronic device 1352 for storage into flash memory 1306. One example of a media reader 1360 is an optical drive such as a CD/DVD drive, which may be used to store data to and read data from a computer readable medium or storage product such as computer readable storage media 1362. Examples of suitable computer readable storage media include optical storage media such as a CD or DVD, magnetic media, or any other suitable data storage device. Media reader 1360 is alternatively able to be connected to the electronic device through the data port 1328 or computer readable program code is alternatively able to be provided to the electronic device 1352 through the wireless network 1350.

Although specific examples of the subject matter have been disclosed, those having ordinary skill in the art will understand that changes can be made to the specific examples without departing from the spirit and scope of the disclosed subject matter. The scope of the disclosure is not to be restricted, therefore, to the specific examples, and it is intended that the appended claims cover any and all such applications, modifications, and examples within the scope of the present disclosure.

The invention claimed is:

1. A navigation device, comprising:
a light emitter disposed within an interior of the navigation device;
a light transmitting touch surface having an upper side and a lower side that is opposite the upper side and separated from the upper side,
a sensor disposed within the interior of the navigation device and operative to sense light emitted from the light emitter that has reflected into the interior of the navigation device from an object in contact with the upper side; and
a redirector sized and positioned within the interior of the navigation device to
obstruct light emitted from the light emitter that is directed at the lower side at a lower angle of approximately 0-45 degrees with respect to the lower side, thereby decreasing an amount of light reflected from the lower side to the interior; and
pass light emitted from the light emitter that is directed at the lower side at a higher angle of approximately 45-90 degrees with respect to the lower side, thereby allowing light to pass through unobstructed to the upper side.

2. The device of claim 1, wherein the redirector is disposed at an angle with respect to the lower side, whereby light emitted from the emitter which would otherwise strike the lower side at the lower angle is reflected into the lower side at the higher angle.

3. The device of claim 1, wherein the redirector is integrally formed with the touch surface and extends from the lower side, and includes a reflective surface.

4. The device of claim 1, wherein the redirector includes a reflective surface.

5. The device of claim 1, further including one or more additional redirectors operative to change a direction of light emitted from the emitter.

6. The device of claim 1, further including one or more barriers operative to block a transmission of light incident on the lower side at the lower angles.

7. The device of claim 1, wherein the redirector defines an aperture portion operative to transmit light and a barrier portion operative to block light.

8. The device of claim 1, wherein the light emitter emits at least one of visible light and infrared light.

9. The device of claim 1, wherein the sensor communicates digital information corresponding to a pattern of light reflected from the object.

10. The device of claim 1, further comprising a barrier operative to block at least a portion of light emitted from the emitter.

11. The device of claim 1, further including one or more barriers operative to block at least a portion of light from the light emitter, thereby decreasing an amount of light incident upon the lower side at the lower angles, the one or more barriers integrally formed with the redirector.

12. The device of claim 1, wherein the redirector forms at least one of a light guide and a prism.

13. The device of claim 1, wherein the redirector changes an angle of light reflected from the lower side of the touch surface in response to the object being in contact with the upper side of the touch surface.

14. The device of claim 1, further including a barrier operative to block light reflected from the lower side of the surface in response to the object being in contact with the upper side of the surface.

15. A navigation device, comprising:
a light emitter disposed within an interior of the navigation device;
a light transmitting touch surface having an upper side and a lower side that is opposite the upper side and separated from the upper side,
a sensor disposed within the interior of the navigation device and operative to sense light emitted from the light emitter that has reflected into the interior of the navigation device from an object in contact with the upper side; and
a redirector sized and positioned at an angle with respect to the lower side of the touch surface within the interior of the navigation device to
redirect light emitted from the light emitter that is directed at the lower side at a low angle of approximately 0-45 degrees with respect to the lower side, thereby directing the light at the lower side at a high angle of approximately 45 to 90 degrees with respect to the lower side; and pass light emitted from the light emitter that is directed at the lower side at the high angle with respect to the lower side, thereby allowing light to pass through unobstructed to the upper side.

16. The apparatus of claim 15, wherein the redirector is integrally formed with the touch surface and extends from the lower side.

17. The apparatus of claim 15, wherein the redirector includes a reflective surface.

18. A navigation device, comprising:
- a light emitter disposed within an interior of the navigation device;
- a light transmitting touch surface having an upper side and a lower side that is opposite the upper side and separated from the upper side,
- a sensor disposed within the interior of the navigation device and operative to sense light emitted from the light emitter that has reflected into the interior of the navigation device from an object in contact with the upper side; and
- a redirector sized and positioned at an angle with respect to the lower side of the touch surface within the interior of the navigation device to
  - redirect light emitted from the light emitter that is directed at the lower side at a low angle of approximately 0-45 degrees with respect to the lower side, thereby directing the light at the lower side at a high angle of approximately 45 to 90 degrees with respect to the lower side; and
  - pass light emitted from the light emitter that is directed at the lower side at the high angle with respect to the lower side, thereby allowing light to pass through unobstructed to the upper side, the redirector defining an aperture portion operative to transmit light and a barrier portion operative to block light.

* * * * *